Jan. 28, 1969  J. P. FRANCIS  3,424,490
SUPPORTING MEANS FOR AUTOMOBILE WINDSHIELD WEATHER VISOR
Filed July 31, 1967
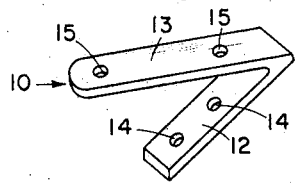
Fig. 6
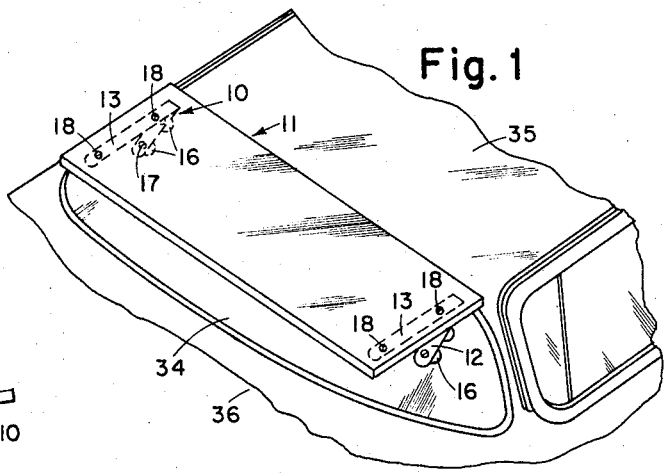
Fig. 1
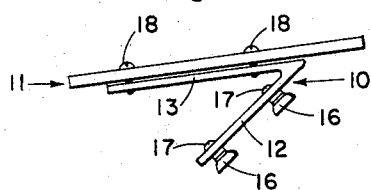
Fig. 2
Fig. 3
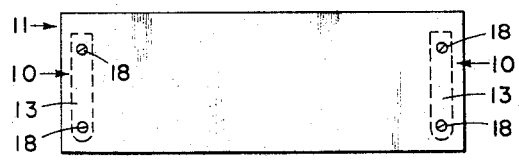
Fig. 7
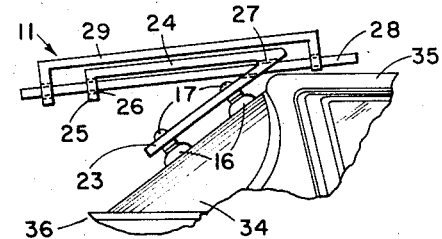
Fig. 4
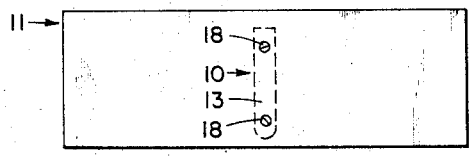
Fig. 8
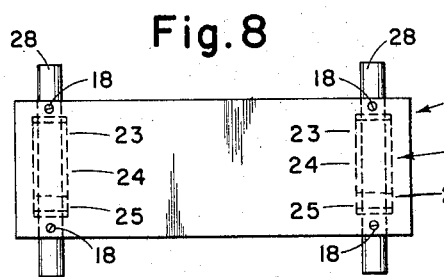
Fig. 9
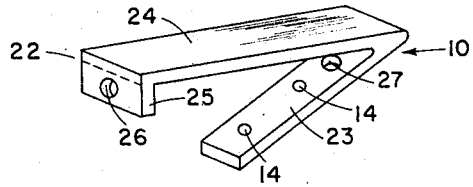
Fig. 5
Fig. 10
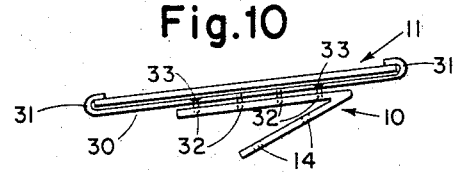
*INVENTOR.*
John P. Francis United States Patent Office 3,424,490
Patented Jan. 28, 1969

3,424,490
SUPPORTING MEANS FOR AUTOMOBILE WINDSHIELD WEATHER VISOR
John P. Francis, 20 Boston St., Haverhill, Mass. 01830
Continuation-in-part of application Ser. No. 571,816, Aug. 11, 1966. This application July 31, 1967, Ser. No. 657,107
U.S. Cl. 296—95
Int. Cl. B60j 1/20
8 Claims

ABSTRACT OF THE DISCLOSURE

This invention provides weather protection to the windshield area, or any other transparent area of an automobile, when the vehicle is in a parked position. The visor supporting means are adapted to removably engage the surface of the windshield for supporting engagement thereto. The visor panel is removably attached to the visor supporting means, or, removably attached as a complete unit to the windshield area. The windshield area of all types of automobiles, including convertibles, are thus capable of being protected from any weather condition.

---

This is a continuation-in-part of application Ser. No. 571,816 filed Aug. 11, 1966, now U.S. Patent No. 3,348,875. Weather visor panel supports and weather visor panel structures are shown and described in my copending application. My invention therefore, is concerned with improved and modified embodiments of a windshield weather visor structure and primarily the supporting means therefor.

The instant invention relates to automobile windshield weather visors, and more particularly to a removably attached weather protector adapted for use in the protection of the windshield area, or other glass or transparent areas of the vehicle. Protection is provided from rain, sleet, snow, ice or heat developed from the rays of the sun when the vehicle is parked in a drive-in theatre, or parked in any other form of an outdoor parking area.

A main object of the invention is to provide a novel, exceedingly simple, and vastly improved weather protector which may be made of expendable and inexpensive material so that it may be discarded after one or more uses. This inexpensive form of a weather visor structure may be constructed of material such as waterproof cardboard, or any other paperboard or similar inexpensive sheet material. The material may be treated with a water-repellant substance commonly employed so that the visor panel is somewhat impervious to water or moisture.

A further object of the invention is to provide a weather visor panel structure having one or more longitudinally disposed laterally spaced apart visor panel supporting members. The visor panel supporting member or members are supported onto the windshield area, whereby all types of automobiles are fully protected due to the location of the visor supporting means on the surface of the windshield area.

With these objects and still others in view, as will hereinafter more fully appear, the invention comprises certain novel constructions, combination and arrangement of parts hereinafter described and claimed and illustrated in the accompanying drawings, in which:

FIGURE 1 is a fragmentary view of an automobile showing the weather visor panel structure and the supporting means for supporting the visor panel over the roof top and the windshield area.

FIGURE 2 is a side elevation view, as in FIGURE 1, showing the weather visor panel removably attached to the upper flat portion of the visor support.

FIGURE 3 is a top plan view of FIGURE 1, with the visor panel shown attached to the two laterally spaced apart visor supports.

FIGURE 4 is a top plan view of a visor panel shown supported onto a single visor support.

FIGURE 5 is a front elevation view of a modified form of a visor panel which may be provided with loop engaging members, or an adhesive area, to removably engage one or more visor supports thereto.

FIGURE 6 is a side elevation view of the visor support of FIGURES 1, 2, 3 and 4.

FIGURE 7 is a side elevation view of a modified form of a visor panel support shown with the attached longitudinally disposed visor supporting member and a modified form of a visor panel.

FIGURE 8 is a top plan view of the visor panel support and the attached longitudinally disposed visor supporting member shown in FIGURE 7, with a modified form of a simple visor panel attached thereto.

FIGURE 9 is a side elevation view of the modified form of visor support of FIGURES 7 and 8; and FIGURE 10 is a side elevation view of another modified form of a visor support, shown with an added visor panel supporting member having curved ends and supported onto the said visor support.

Referring now more particularly to the drawings, attention is directed primarily to FIGURES 1, 2, 3, 4, 6, 8, 9 and 10 wherein numeral 10 generally indicates the visor panel supports, also shown specifically as visor panel supports 22 in FIGURES 7, 8 and 9. Numeral 11 generally indicates the weather visor panel structure, also shown specifically as weather visor panel structures 21, FIGURE 5, and 29, FIGURE 7, respectively.

In FIGURE 1, a portion of an automobile 36 is shown, with the weather visor panel 11 made of waterproof material, supported by the longitudinally disposed laterally spaced apart visor panel supports 10. The visor panel 11 is shown supported from and above the windshield area 34 and extending rearwardly over the roof top 35.

In FIGURE 2 the visor support 10 is shown provided with a longitudinally disposed and angularly positioned flat upper portion 13 and a vertically disposed and angularly positioned flat lower portion 12. The lower flat portion 12 is provided with windshield engaging means in the form of vacuum cups 16 secured by threaded bolt members 17 thereto.

Referring back to FIGURE 1, there is shown a substantially rectangular shaped flat visor panel structure 11 constructed of cardboard or similar inexpensive sheet material, and which may be treated with a water-repellant substance commonly applied so that the material is somewhat imprevious to moisture or water. It is quite obvious that other material such as Masonite, sheet metal, plastic or any other suitable material may be used for the visor panel 11.

The visor panel support 10, shown in FIGURE 6, is provided with apertures 15 on the flat upper portion 13 adapted to engage the visor panel securing means 18, in the form of a bolt or pin member shown in FIGURES 1, 2, 3, 4 and 8. Also shown in FIGURE 6 are the apertures 14 of the lower flat portion 12 adapted to engage threaded bolt members 17 of FIGURE 2.

Referring to FIGURE 3, the visor panel supports 10 are shown removably attached to the under side of the visor panel 11 by the visor panel securing means 18.

In FIGURE 4, a single centrally located visor support 10 is shown, which is removably attached to the visor panel 11 as in FIGURE 3.

A modified form of a visor panel 21 is shown in FIGURE 5. Any number of loop members 20 may be formed or attached to the underside of the visor panel 21 and are adapted to slidably engage the visor supports 10 for removable attachment thereto. Also shown is an adhesive or cement coated area 19 which is adapted to adhesively engage the upper flat portion 13 of the visor panel support 10.

In FIGURE 10, there is shown a modified form of a visor panel support 10 which is provided with an additional longitudinally disposed visor supporting member 30. The said member 30 is provided with opposed upwardly curved end portions 31 to freely engage the visor panel 11 for supporting engagement. The additional supporting member 30 may be adjustably secured to two of the four (or more) shown bolt engaging apertures 32, formed on the upper flat portion 13, and secured by the two threaded bolt members 33 or other suitable securing means.

The visor panel supporting means comprises, in general, the visor panel supports 10 or visor panel supports 22 which are removably attached to the vacuum cups 16 by the threaded bolt members 17, substantially as shown in FIGURES 1, 2 and 7. The vacuum cups 16 are attached to the windshield area 34, at the selected height thereon, to provide frictional and rain sealing engagement of the rear lateral portion of the visor panel 11, or, to provide spaced apart relationship of the visor panel 11 relative to the lateral portion of the roof top.

It is quite obvious that the longitudinally angular position of the upper flat portion 13 or 24 of the visor panel support 10 may be altered. The forced bending or pulling of the upper flat portion 13 or 24, to or from the lower flat portion 12 or 23, provides any desired angularity for the attached visor panel 11 over the windshield area 34. Thus, adjustable angularity of the visor panel support 10 may be made depending upon the type of material used therefor, and depending upon the angularity of the windshield area or other glass area, and the desired angularity of the attached visor panel 10.

In FIGURE 7, a side elevation view is shown of a modified form of a visor panel support 22 having a flat upper portion 24 provided with a downwardly extending flat portion 25 at the forward end thereof. A removably attached visor panel engaging and supporting member 28 is shown engaged to the aperture 26 of flat portion 25, and aperture 27 of the downwardly angled flat portion 23. The longitudinally movable visor panel supporting member 28 engages the pposing laterially disposed and downwardly extending portions of the visor panel 29 for the support of said visor panel.

In FIGURE 8, a top plan view of the modified form of a visor panel support 22 of FIGURE 7 is shown. A modified and simplified flat sheet visor panel structure 11 is shown, which is removably attached to the longitudinally disposed and laterally spaced apart visor panel engaging and supporting members 28. The visor panel structure 11 is removably attached by the securing means 18 to the supporting members 28.

FIGURE 9 is a side elevation view of the modified visor panel support 22 of FIGURES 7 and 8. Apertures 26 and 27, of the forward vertically disposed flat portion 25 and the rear forwardly angled flat portion 23, are adapted to engage the longitudinally disposed visor panel supporting member 28 of FIGURES 7 and 8. Apertures 24, of the rear forwardly angled flat portion 23, are for receiving the threaded bolt members 17 of vacuum cups 16, as shown in FIGURES 2 and 7.

Referring once more to FIGURE 1, it is to be noted that the laterally spaced apart visor supports 10 may be removably attached to the windshield area 34 at any selected height thereon, and at any selected lateral position, more so when a single visor support 10 is employed. In a majority of automobiles, the windshield wipers may be used if desired, depending upon the location and the clearance of the attached visor support or supports 10 on the windshield area 34. The visor panel 11 may be of any suitable dimension both laterally and longitudinally, and supported in any suitable longitudinal position on the upper flat portion 13 of the visor supports 10.

An important feature of the novel invention is that all types of motor vehicles may be full protected for vision, since the visor supporting means are removably attached to the windshield area, or, to any other glass or transparent area of the vehicle. Thus convertibles, and automobiles having a fabric covered or flexible roof top are fully protected due to the location of the visor supporting means. Since the visor supporting means are removably attached to the glass area, any and all imprints left by the vacuum cups are very easily removed therefrom, whereas, such devices removably attached to "hard" roof tops leave vacuum cup marks and imprints which require considerable effort to remove therefrom.

While certain embodiments of my invention have been disclosed in the foregoing description, it will be understood that various modifications may occur to those skilled in the art. Changes, therefore, in the construction and arrangement, may be made without departing from the spirit and the scope of the invention as disclosed in the appended claims.

I claim:

1. Automobile windshield weather visor supporting means for supporting a removably attached windshield weather visor panel, comprising a relatively thin dual portioned and adjustably bendable visor panel supporting member having a longitudinally disposed flat upper portion extending forwardly in a somewhat downward angle, and a bendable angled flat lower portion extending forwardly and downwardly from the rearmost end portion of said upper flat portion and provided with at least one aperture for the support of said supporting member, said bendable longitudinally disposed vertically spaced apart lower flat portion adapted to be adjustably bent to or from the said somewhat downwardly angled upper flat portion in a dissimilar and a much greater downward angle than the said upper flat portion thereby providing a selected angular supporting position of said upper flat portion in supporting said visor panel in one of a number of selected weather protection and viewing clearance positions the upper surface of the said flat upper portion of said supporting member engaging and supporting the said removably attached visor panel thereto, at least one vacuum cup removably attached to a preselected vertical and lateral supporting position on the windshield area and attached to the under surface of the said angled flat lower portion of said visor panel supporting member by securing means engaging the said aperture thereof, said removably attached vertically repositionable visor panel supporting member adjustably supporting the said visor panel so that the rear lateral portion of said visor panel is adapted to frictionally engage the lateral portion of the roof top in rain sealing engagement therewith or adapted to be supported in a vertically spaced apart relationship relative to the roof top depending upon the said vertical location of the said supporting position of said supporting member on the windshield area or depending upon the angularity and the rearmost vertical position of the said flat upper portion of said supporting member relative to the roof top.

2. Automobile windshield weather visor supporting means for supporting a removably attached windshield weather visor panel, comprising laterally spaced apart relatively thin dual portioned and adjustably bendable visor panel supporting members, each of said supporting members having a longitudinally disposed flat upper portion extending forwardly in a somewhat downward angle, and a bendable angled flat lower portion extending forwardly and downwardly from the rearmost end portion of said upper flat portion and provided with apertures for the support of said supporting members, said bendable longitudinally disposed vertically spaced apart lower flat portions adapted to be adjustably bent to or from the said somewhat downwardly angled upper flat portions in a dissimilar and a much greater downward angle than the said upper flat portions upon application of manual force to said lower flat portions thereby providing a selected angular supporting position of said upper flat portions in supporting said visor panel in one of a number of selected weather protection and viewing clearance positions, the upper surface of the said flat upper portion of each of the said supporting members engaging and supporting the said removably attached visor panel thereto, vacuum cups removably attached to a preselected vertical and lateral supporting position on the windshield area and attached to the under surface of the said angled flat lower portion of each of the said visor panel supporting members by securing means engaging the said apertures thereof, said removably attached vertically repositionable visor panel supporting members adjustably supporting the said visor panel so that the rear lateral portion of said visor panel is adapted to frictionally engage the lateral portion of the roof top in rain sealing engagement therewith or adapted to be supported in a vertically spaced apart relationship relative to the roof top depending upon the said vertical location of the said supporting position of said supporting members on the windshield area or depending upon the angularity and the rearmost vertical position of the said flat upper portion of each of the said supporting members relative to the roof top.

3. Automobile windshield weather visor supporting means for supporting a removably attached windshield weather visor panel, comprising a first relatively thin dual portioned and adjustably bendable visor panel supporting member having a longitudinally disposed flat upper portion extending forwardly in a somewhat downward angle, and a bendable angled flat lower portion extending forwardly and downwardly from the rearmost end portion of said upper flat portion and provided with apertures for the support of said first supporting member, said bendable longitudinally disposed vertically spaced apart lower flat portion adapted to be adjustably bent to or from the said somewhat downwardly angled upper flat portion in a dissimilar and a much greater downward angle than the said upper flat portion thereby providing a selected angular supporting position of said upper flat portion in supporting said visor panel in one of a number of selected weather protection and viewing clearance positions a second visor panel engaging and supporting member engaging and supporting the said removably attached visor panel thereto, said second visor panel supporting member being adjustably and removably attached by securing means to the upper surface of said upper portion of said first visor panel supporting member, vacuum cups removably attached to a preselected vertical and lateral supporting position on the windshied area and attached to the under surface of the said anged flat lower portion of said first visor panel supporting member by securing means engaging the said apertures thereof, said removably attached vertically repositionable first visor panel supporting member adjustably supporting the said visor panel so that the rear lateral portion of said visor panel is adapted to frictionally engage the lateral portion of the roof top in rain sealing engagement therewith or adapted to be supported in a vertically spaced apart relationship relative to the roof top depending upon the said vertical location of the said supporting position of said first supporting member on the windshield area or depending upon the angularity and the rearmost vertical position of the said second visor panel supporting member relative to the roof top.

4. Automobile windshield weather visor supporting means for supporting a removably attached windshield weather visor panel, comprising laterally spaced apart first relatively thin dual portioned and adjustably bendable visor panel supporting members, each of said supporting members having a longitudinally disposed flat upper portion extending forwardly in a somewhat downward angle, and a bendable angled flat lower portion extending forwardly and downwardly from the rearmost end portion of said upper flat portion and provided with apertures for the support of said first supporting members, said bendable longitudinally disposed vertically spaced apart lower flat portions adapted to be adjustably bent to or from the said somewhat downwardly angled upper flat portions in a dissimilar and a much greater downward angle than the said upper flat portions upon application of manual force to said lower flat portions thereby providing a selected angular supporting position of said upper flat portions in supporting said visor panel in one of a number of selected weather protection and viewing clearance positions, second visor panel engaging and supporting members engaging and supporting the said removably attached visor panel thereto, each of the said second visor panel supporting members being adjustably and removably attached by securing means to the upper surface of said upper portion of said first visor panel supporting members, vacuum cups removably attached to a preselected vertical and lateral supporting position on the windshield area and attached to the under surface of the said angled flat lower portion of each of the said first visor panel supporting members by securing means engaging the said apertures thereof, said removably attached vertically repositionable first visor panel supporting members adjustably supporting the said visor panel so that the rear lateral portion of said visor panel is adapted to frictionally engage the lateral portion of the roof top in rain sealing engagement therewith or adapted to be supported in a vertically spaced apart relationship relative to the roof top depending upon the said vertical location of the said supporting position of said first supporting members on the windshield area or depending upon the angularity and the rearmost vertical position of the said second visor panel supporting members relative to the roof top.

5. Automobile windshield weather visor supporting means for supporting a removably attached windshield weather visor panel, comprising a first visor panel supporting member having a longitudinally disposed flat upper portion extending forwardly in a somewhat downward angle, an angled flat lower portion extending forwardly and downwardly from the rearmost end portion of said upper flat portion and provided with apertures for the support of said first supporting member, a second visor panel engaging and supporting member having at least one upwardly curved end portion adapted to engage and support a lateral edge portion of the said removably attached visor panel thereto, said second visor panel supporting member being adjustably and removably attached by securing means to the upper surface of said upper portion of said first visor panel supporting member, vacuum cups removably attached to a preselected vertical and lateral supporting position on the windshield area and attached to the under surface of the said angled flat lower portion of said first visor panel supporting member by securing means engaging the said apertures thereof, said removably attached vertically repositionable first visor panel supporting member adjustably supporting the said visor panel so that the rear lateral portion of said visor panel is adapted to frictionally engage the lateral portion of the roof top in rain sealing engagement therewith or adapted to be supported in a vertically spaced apart relationship relative to the roof top depending upon the said vertical location of the said supporting position of said first supporting member on the windshield area or depending upon the angularity and the rearmost vertical position of the said second visor panel supporting member relative to the roof top.

6. Automobile windshield weather visor supporting means for supporting a removably attached windshield weather visor panel, comprising a first visor panel supporting member having a longitudinally disposed flat upper portion extending forwardly in a somewhat downward angle, an angled flat lower portion extending forwardly and downwardly from the rearmost end portion of said upper flat portion and provided with apertures for the support of said first supporting member, a second visor panel engaging and supporting member having opposing upwardly curved end portions adapted to freely engage the lateral edge portions of said visor panel in supporting the said removably attached visor panel to said supporting member, said second visor panel supporting member being adjustably and removably attached by securing means to the upper surface of said upper portion of said first visor panel supporting member, vacuum cups removably attached to a preselected vertical and lateral supporting position on the windshield area and attached to the under surface of the said angled flat lower portion of said first visor panel supporting member by securing means engaging the said apertures thereof, said removably attached vertically repositionable first visor panel supporting member adjustably supporting the said visor panel so that the rear lateral portion of said visor panel is adapted to frictionally engage the lateral portion of the roof top in rain sealing engagement therewith or adapted to be supported in a vertically spaced apart relationship relative to the roof top depending upon the said vertical location of the said supporting position of said first supporting member on the windshield area or depending upon the angularity and the rearmost vertical position of the said second visor panel supporting member relative to the roof top.

7. Automobile windshield weather visor supporting means for supporting a removably attached windshield weather visor panel, comprising a first visor panel supporting member having a longitudinally disposed flat upper portion extending forwardly in a somewhat downward angle, a vertically disposed flat portion extending downwardly from the forward end of said flat upper portion and provided with an aperture therethrough, an angled flat lower portion extending forwardly and downwardly from the rearmost end portion of said upper flat portion and provided with an upper aperture and also lower spaced apart apertures therethrough, a longitudinally disposed second visor panel engaging and supporting member adjustably engaging the said apertures of the said angled flat lower portion and said downwardly extending flat portion and adapted to engage and support the said removably attached visor panel to said second visor panel engaging and supporting member, vacuum cups removably attached to a preselected vertical and lateral supporting position on the windshield area and attached to the under surface of the said angled flat lower portion of said first visor panel supporting member by securing means engaging the said lower spaced apart apertures of said flat lower portion, said removably attached vertically repositionable first visor panel supporting member adjustably supporting the said visor panel so that the rear lateral portion of said visor panel is adapted to frictionally engage the lateral portion of the roof top in rain sealing engagement therewith or adapted to be supported in a vertically spaced apart relationship relative to the roof top depending upon the said vertical location of the said supporting position of said supporting member on the windshield area or depending upon the angularity and the rearmost vertical position of the said second visor panel engaging and supporting member relative to the roof top.

8. Supporting means for supporting a removably attached automobile windshield weather visor panel, comprising a visor panel supporting member formed from a flat elongated strip of bendable material, said flat material bent in a downward and forward angle to form an angled lower flat portion and provided with an upper aperture and also lower spaced apart apertures therethrough, the upper flat portion bent at the rearmost end portion of the said bent lower flat portion in a forward and a much less downward angle than the said angled lower flat portion, the forward end of the said upper flat portion bent downwardly to form a short vertically disposed supporting portion and provided with an aperture therethrough, a longitudinally disposed visor panel engaging and supporting member adapted to removably engage the said apertures of the said angled lower flat portion and said downwardly extending flat supporting portion of said angled upper flat portion, said longitudinally disposed visor panel engaging and supporting member adapted to support a removably attached visor panel thereto, and the said lower spaced apart apertures of said angled lower flat portion adapted to removably engage windshield engaging means thereto for the support of said visor panel supporting member.

References Cited

UNITED STATES PATENTS

| 576,110 | 2/1897 | Graves | 248—248 |
|---|---|---|---|
| 2,511,401 | 6/1950 | Ellithorpe | 296—95 |
| 2,628,807 | 2/1953 | Lincoln | 296—95 X |
| 2,972,377 | 2/1961 | Jacobs | 296—95 X |
| 3,174,536 | 3/1965 | Francis | 296—95 X |
| 3,205,000 | 9/1965 | Francis | 296—95 |
| 3,219,385 | 11/1965 | Francis | 296—95 |

LEO FRIAGLIA, *Primary Examiner.*

JOHN A. PEKAR, *Assistant Examiner.*

U.S. Cl. X.R.

160—368